Patented June 19, 1934

1,963,231

UNITED STATES PATENT OFFICE 1,963,231

MANUFACTURE OF AQUEOUS EMULSIONS

Jacob M. Fain, Brooklyn, N. Y., assignor, by mesne assignments, to The Patent and Licensing Corporation, New York, N. Y., a corporation of Massachusetts No Drawing. Application January 6, 1930, Serial No. 419,002

5 Claims. (Cl. 134—1)

This invention relates to improvements in the manufacture of aqueous emulsions of substances normally immiscible with water such, for example, as bitumens, pitches, resins, rubber, and the like.

More particularly, the invention is concerned with improvements in the manufacture of aqueous emulsions of such water-immiscible substances with the aid of emulsifying agents comprising hydrophyllic colloidal powders, for example, finely divided clays or clay-like material, bentonite, colloidal oxides, casein, starch and the like.

The principal object of the invention is to provide methods of treating hydrophyllic colloidal powders to be used in making emulsions of the type indicated, whereby to hydrate such colloidal powders, render them more uniform and enhance the emulsifying power thereof.

According to the invention, hydrophyllic colloidal powders in aqueous suspension are subjected to treatment whereby to substantially increase the viscosity of the suspension. Under ordinary conditions, peptization of a colloid in suspension reduces the viscosity of the suspension so that, in spite of the increase in the colloidality, the suspension is not efficient as an emulsifying agent for substances such as asphalt and the like.

The present invention provides methods of peptizing colloids in suspension and of effecting an increase in the viscosity of the suspension.

In one mode of carrying out the invention, a relatively thin aqueous suspension of the colloid is passed one or more times through a colloid mill. By this mechanical action the colloid in the suspension is peptized, and yet there is a concurrent substantial increase in viscosity of the suspension.

Increase in viscosity of the suspension by the colloid mill treatment thereof is rather an unexpected result of such treatment since, ordinarily, peptization is accompanied by a decrease in the viscosity of the suspension. Apparently such increase in viscosity is due to the fact that the increase in the hydration of the colloid as a result of the colloid mill treatment is more than sufficient to offset the reduction in viscosity normally resulting from peptization.

Specifically illustrating this mode of carrying out the invention, a suspension of approximately five parts bentonite in one hundred parts water, which normally has a viscosity of about forty seconds measured by the Pennsylvania R. R. pipette, is passed two or three times through a colloid mill of any well known type, the clearance space between the working surfaces of the mill being adjusted for this purpose to approximately 0.003 of an inch. As a result of this treatment, the bentonite becomes peptized and concurrently therewith, the viscosity of the suspension is increased to about 50 seconds. The suspension may then be employed as the emulsifying agent in the continuous emulsification of the water-immiscible substances with which the present invention is concerned.

Numerous clays or clay-like materials, and in general finely divided hydrophyllic powders, may thus be converted into efficient agents for effecting emulsification of asphalt or the like, by passing an aqueous suspension of the powder one or more times through a colloid mill.

Similarly, casein may be peptized and brought to swollen condition by subjecting the same together with sodium borate or the like, at normal temperatures, to the action of a colloid mill, thus avoiding the necessity of heating the casein and sodium borate in order to make a swollen paste suitable as an emulsifying agent for bitumens, pitches and the like.

Another mode of carrying out the invention is to treat the aqueous suspension of the hydrophyllic powder with a peptizing agent such, for example, as tannic acid, and thereafter to increase the viscosity of the suspension by partially flocculating the colloid. In place of tannic acid, I may use oxalic, tartaric, citric, or pyrogallic acids, which serve as peptizing agents when employed in low concentration. The partial flocculation of the colloid may best be effected by means of electrolytes preferably those yielding bi- or multi-valent ions in solution. The partial flocculation is desirably carried to a predetermined degree such that, when the suspension is employed in emulsifying substances such as asphalt, or the like, the maximum amount of the colloid will be caused to go into the interface between the asphalt and water components of the system, where it best exerts its effect in promoting the emulsification. The optimum degree of flocculation to achieve this effect can readily be determined by the skilled operator and will depend among other factors, upon the character of the material to be emulsified, the nature of the colloidal emulsifying agent, the type of emulsifying apparatus, the nature of the flocculating agent, etc. Nevertheless, with a few trials, the skilled operator will readily ascertain the precise quantities of electrolyte necessary under any given conditions, to provide the optimum degree of flocculation. Thereafter, the emulsification may be carried on by adhering to the quantities of electrolyte as thus predetermined. Where the flocculating agent is an electrolyte which alters the hydrogen ion concentration of the suspension, the regulation of the partial flocculation may conveniently be accomplished by means of hydrogen ion measurement of the suspension, upon addition of the flocculating agent thereto.

Specifically illustrating this phase of the invention, a suspension of approximately five parts bentonite in one hundred parts of water may be treated with tannic acid in amounts approximating about 1% by weight of tannic acid calculated on the weight of the bentonite in the suspension. The tannic acid causes the bentonite to become peptized and there is an accompanying slight reduction in the viscosity of the suspension. In order then to effect an increase in the viscosity of the suspension such that it will provide a sufficient degree of internal friction to promote emulsification of substances such as asphalt, the peptized suspension is treated with small quantities of a flocculating agent. For this purpose, the flocculating agent may comprise substances such as aluminum chloride, aluminum sulphate, potassium bichromate, and in general, electrolytes yielding bi- or multi-valent ions in solution.

With a suspension of bentonite of the concentration specified and peptized with tannic acid in the quantities indicated, optimum conditions according to the invention have been obtained with 1% to 2% by weight of potassium bichromate, calculated on the weight of the bentonite in the suspension. The suspension as thus prepared has proved capable of emulsifying asphalt of 100° to 200° F. melting point to an extent such that the ratio of asphalt to the particular kind of bentonite in the emulsion may be as high as 30 to 50 parts asphalt to one part of bentonite, the average size of the emulsified asphalt particles in the finished emulsion varying from 2 to 20 $\mu$. Since the same untreated bentonite suspension under usual conditions is capable of producing an asphalt emulsion in which the ratio of asphalt to bentonite is at best about 25 to 1, the advantages of preparing the bentonite suspension in accordance with the invention will be readily appreciated by those skilled in the art.

It will be appreciated that various bentonites have variable emulsive properties so that the proportions here mentioned are characteristic of material from one particular source. However, with whatever bentonite which is employed, the increase of emulsive properties is substantial when treated as above described.

The method of partially flocculating the suspension which has been peptized by means of a peptizing agent such as tannic acid, may also be utilized in conjunction with a suspension which has been subjected to a colloid mill action as hereinabove described. Thus, a suspension of about 5 parts bentonite in 100 parts water, which has been passed two or three times through a colloid mill, as a result of which the bentonite is peptized and the suspension increased in viscosity from about 40 to 50 seconds (Pennsylvania R. R. pipette) may be treated with about 1% by weight (calculated on the weight of the bentonite) of potassium bichromate. Thereby the viscosity of the suspension is increased to about 90 seconds, and the peptized bentonite is partially flocculated to the extent representing optimum conditions for efficient emulsification.

In some cases also it may be desirable and advantageous to utilize the combined effects of the colloid mill and a peptizing agent, followed by a treatment for partially flocculating the colloid. In such cases, tannic acid, for example, would preferably be combined with the suspension of the colloid, and the mixture passed one or more times through a colloid mill, whereafter, predetermined quantities of flocculating agents, such for example, as those hereinabove specified, may be added to the suspension to condition the same for optimum emulsification of the particular material to be emulsified.

I do not of course, wish to be limited in any way to any particular type of colloid mill just as long as I secure the action of closely adjacent surfaces movable past each other at a relatively high velocity, whereby the particles being subjected to colloid mill action become more and more finely divided.

It is to be understood that I am not placing any particular emphasis on the use of a relatively thin aqueous suspension—I have secured similar results with suspensions of greater concentration.

I claim as my invention:

1. The method of enhancing the emulsifying efficiency of hydrophyllic colloids which comprises the steps of introducing an aqueous suspension of the hydrophyllic colloids to a colloid mill and there subjecting it to the action of the colloid mill to an extent sufficient to peptize the same, continuing the action of the mill on the colloid until there has been a substantial increase in the viscosity of the peptized suspension and in thereafter dispersing bitumen in the thus treated suspension by agitation to form an aqueous bituminous emulsion.

2. The method of enhancing the emulsifying efficiency of hydrophyllic colloids which comprises the steps of introducing an aqueous suspension of the hydrophyllic colloid, in the presence of a peptizing agent, to a colloid mill and there subjecting it to the action of said mill to peptize the same, continuing the action of the colloid mill on the peptized colloid suspension until there has been a substantial hydration of the colloid and a substantial increase in the viscosity of the suspension and thereafter dispersing bitumen in the thus treated suspension by agitation to form an aqueous bituminous emulsion.

3. The method of enhancing the emulsifying efficiency of hydrophyllic colloids which comprises the steps of introducing an aqueous suspension of the colloid to a colloid mill and there subjecting it to the action of such mill until the colloid has been peptized, continuing the action of the colloid mill on the peptized colloid until substantial hydration of the colloid and a substantial increase in its viscosity has occurred and in thereafter subjecting the thus peptized suspension to a flocculating agent whereby to effect a predetermined partial flocculation of the colloid in suspension and in finally dispersing bitumen in the thus treated suspension by agitation to form an aqueous bituminous emulsion.

4. The method of enhancing the emulsifying efficiency of hydrophyllic colloids which comprises the steps of subjecting an aqueous suspension of the colloid in the presence of a peptizing agent to the action of a colloid mill where the same is peptized and continuing the action of the colloid mill on the peptized colloid until the same has been hydrated sufficiently to substantially increase the viscosity of the peptized suspension, subjecting the peptized suspension to the action of a flocculating agent whereby to effect a predetermined partial flocculation of the colloid in suspension and finally dispersing bitumen in the thus treated suspension by agitation to form an aqueous bituminous emulsion.

5. The method of enhancing the emulsifying efficiency of hydrophyllic colloids which comprises the steps of subjecting an aqueous suspension of the colloid to the action of a colloid mill and continuing the treatment until the colloid has been sufficiently peptized, continuing the action of the colloid mill on the peptized colloid until such time as the peptized colloid becomes hydrated to an extent sufficient to substantially increase the viscosity of the suspension, thereafter treating the suspension with predetermined quantities of an electrolyte to effect a predetermined partial flocculation of the colloid in suspension and dispersing bitumen in the thus treated suspension by agitation to form an aqueous bituminous emulsion.

JACOB M. FAIN.